Aug. 16, 1966  G. L. THOMAS ET AL  3,266,096
PRE-PACKING APPARATUS
Filed Dec. 23, 1963  3 Sheets-Sheet 1

Inventors:
Grant L. Thomas
George H. Logan
By Horton, Davis, Brewer & Bruguon Attys.

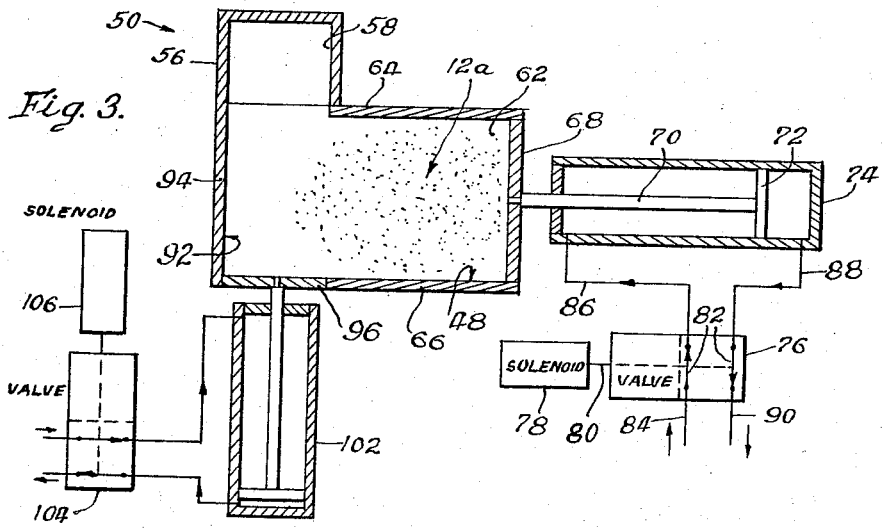
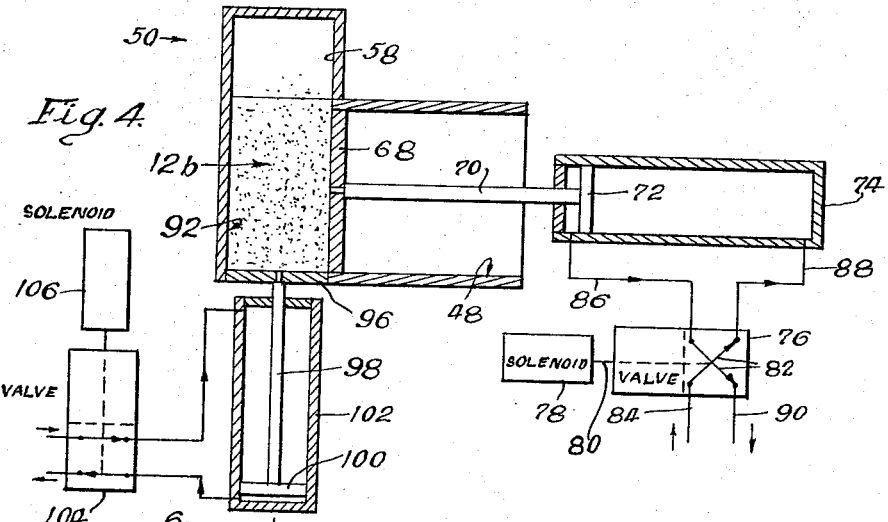
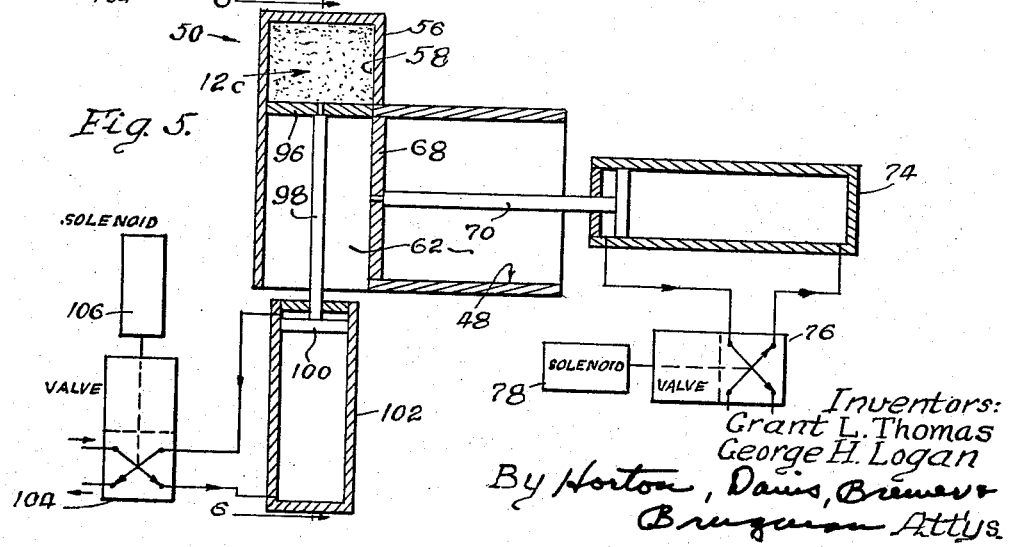

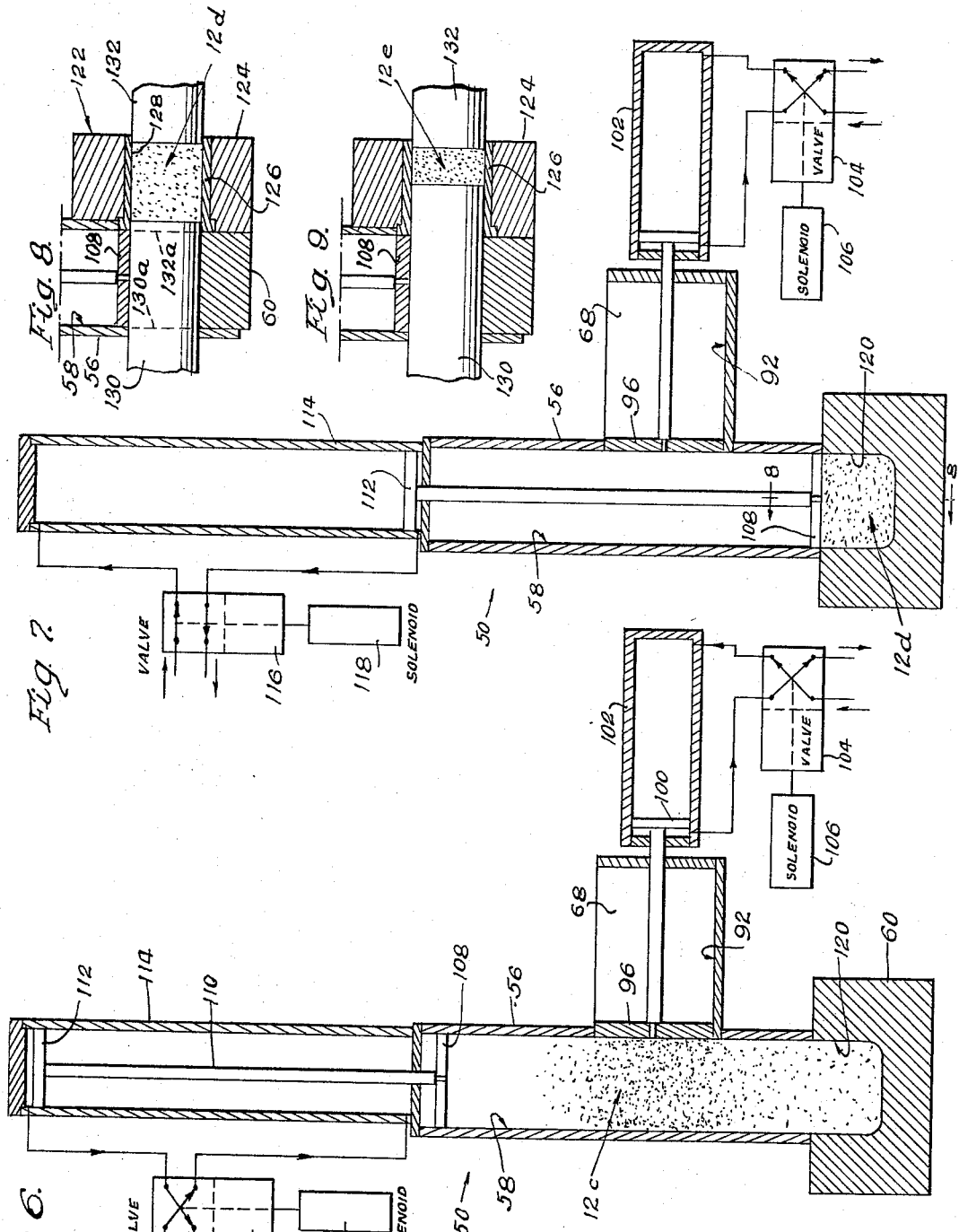

3,266,096
PRE-PACKING APPARATUS
Grant L. Thomas, Roselle, and George H. Logan, Park Ridge, Ill., assignors to Logan Engineering Co., Chicago, Ill., a corporation of Illinois
Filed Dec. 23, 1963, Ser. No. 332,408
2 Claims. (Cl. 18—16)

The present invention relates to a pre-packing apparatus.

The invention relates more particularly to pre-packing of material which in its original state is non-uniform in density, and more specifically is non-uniform in the size and shape of the particles thereof, and additionally has poor flow characteristics, such that presently known apparatus and methods for packing such material in uniform quantities are not fully effective.

The invention finds particular adaptation to pre-packing plastic material made up of widely different kinds of particles such as fibers, flakes, and other shapes, and which furthermore may be light and fluffy, or highly aerated, and sticky or tacky so that the material will not readily flow, the result of which is that the material cannot be advantageously measured to provide consistently uniform quantities.

In molding plastic material it is desired that the quantity of material introduced into a mold be as nearly as possible the exact amount to completely fill the mold, since if the quantity is less than the volume of the mold a scant and imperfect molded product is produced, while on the other hand if the quantity is greater than the volume of the mold, flash is produced on the molded article which is a disadvantage in that in many cases the molded article is extremely hard and the flash is difficult to remove from it, in addition to the greater amount of time and effort required for removing the flash.

It is desired that such accurately measured quantities be in the form of compacted cakes or pellets, but difficulties arise in connection with forming such cakes or pellets of accurate size and density in the case of plastics having the characteristics referred to above. Because of the different kinds of particles making up the mass of plastic material being handled, its volume is irregular and inconstant and therefore the desired quantities cannot be achieved by volumetric measuring. A further difficulty is encountered in packing such material, which in many if not most cases is extremely light from the standpoint of density. Efforts to pre-pack such light and non-dense material to a condition comparable to other materials in which the desired quantities are packed into small cakes or pellets that are extremely dense, have not been completely successful because the plastic material adheres and clings to the walls of the chamber in which the packing operation is performed. In other words there is a practical limit to the pressure that may be applied in such non-dense material for the desired results. Furthermore in the region close to the compacting element, such as a ram, the material is generally too highly compacted, while in the far or remote portion it is compressed only slightly or not at all, resulting in an extremely irregular packing operation.

A broad object therefore of the present invention is to provide novel apparatus for pre-packing material of non-uniform density that overcomes the objections to previously known apparatus and methods.

Another and more specific object is to provide apparatus for pre-packing material, of non-uniform density wherein it is pre-packed in a series of steps, each step embodying successively increased pressure, and wherein the pressure applied in each step is so applied in a direction transverse to that of the previous step.

Still another object is to provide novel apparatus for pre-packing non-uniform material, such as plastic material, which apparatus overcomes resistance to packing because of stickiness or tackiness or other resistance to flowing.

A still further object is to provide novel apparatus for pre-packing materials, such as non-uniform plastic material, utilizing novel steps in transporting the material from its original source, such as a container, to the pre-packing apparatus and ultimately to the final high pressure packed form.

Other objects and advantages of the invention will appear from the following detailed description taken in conjunction with the accompanying drawings in which:

FIG. 3 is a transverse sectional view through the packing machine;

FIG. 4 is a view similar to FIG. 3 but with certain of the elements in different positions;

FIG. 5 is a view similar to FIGS. 3 and 4 but with others of the elements in different positions;

FIG. 6 is a vertical sectional view of the packing machine taken at line 6—6 of FIG. 5;

FIG. 7 is a view similar to FIG. 6 but with certain of the elements in different positions;

FIG. 8 is a fragmentary sectional view taken at line 8—8 of FIG. 7; and

FIG. 9 is a view similar to FIG. 8 but showing certain of the elements in different positions.

Figure 1:
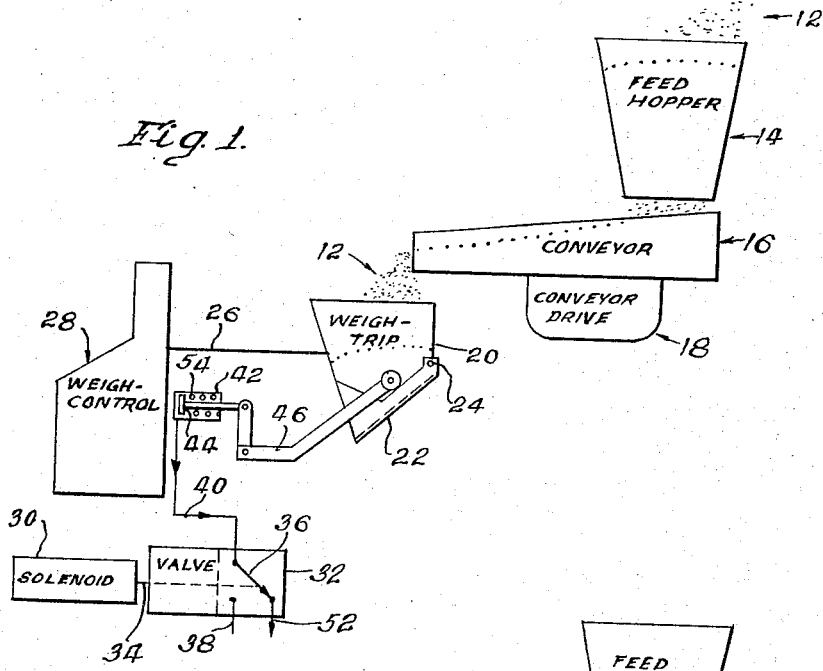
FIG. 1 is a semi-diagrammatic view of certain components of apparatus utilized in the practice of the invention for initially measuring the material and transporting it to the pre-packing machine.
Figure 2:
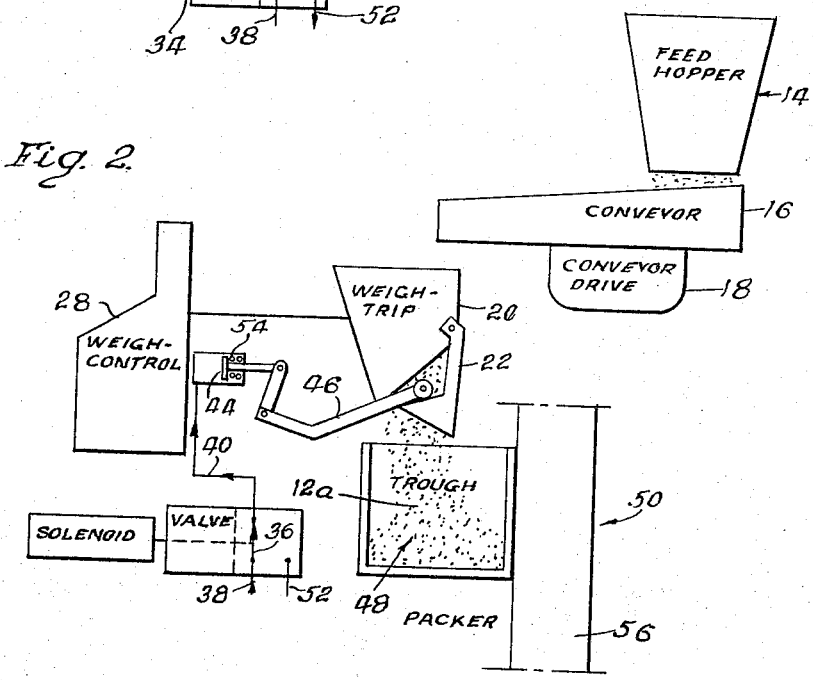
FIG. 2 is a view similar to FIG. 1 showing certain of the parts in different positions and also including a portion of the pre-packing machine.

Referring now in detail to the drawings, attention is directed first to FIGS. 1 and 2 illustrating means for weighing quantities of the material to be pre-packed. Due to the non-uniformity of density of the exemplary material to which the invention is applied, it is impracticable or impossible to measure it by volume. Accordingly the present invention utilizes a weighing step in the pre-packing operation since regardless of the density of the material, a quantity of material of a given weight will result in an end product of a given density when pre-packed to the limits of a pre-determined volume. In the use of the apparatus illustrated in FIG. 1 the plastic material 12 is introduced from its original container into a feed hopper 14 of suitable form and construction, the details of which may be as desired. The plastic material 12 drops from the hopper into a conveyor 16 which may be any of a variety of known conveyors, such as an inclined trough. The material is conveyed therethrough by a suitable conveyor drive 18 which in the present instance may be a vibrator. It will be understood that other forms of conveyor may be utilized as well, such as an endless belt, auger, etc. The material falls from the conveyor 16 into a weighing means 20 of known kind which includes a bucket or hopper provided with a gate 22 mounted thereon by suitable means such as pivot means 24 and normally disposed in closed position shown in FIG. 1.

The weighing device 20 is connected through an instrumentality or link 26 with a weight sensing device 28, also of known kind. The devices 20 and 28 provide certain control functions according to the weight of the material in the device 20 according to a presetting thereof. Specifically the bucket 20 is mounted on suitable supports or hangers such that it is normally maintained in an upper position and when a quantity of material of predetermined weight is deposited in it, it descends, and acting through the link 26 the sensing device 28 is controlled thereby to perform other control functions. One of those functions is to terminate the operation of the conveyor drive 18 and another is to actuate a solenoid 30 arranged to operate the valve 32. Upon such actuation of the solenoid and consequent actuation of the armature 34 thereof, as by retraction, the movable member 36 of the valve is moved from the position of FIG. 1 to the position of FIG. 2 whereupon fluid, such as compressed air or liquid, is introduced through inlet line 38 from a suitable source (not shown) and flows through line 40 into a power cylinder 42. This fluid then advances the piston 44 thereof to the position shown in FIG. 2 which in turn actuates an arm 46 in operative engagement with the gate 22 which opens that gate to permit the quantity of material from the bucket 20 to drop out. In the present instance this material is deposited in a trough 48 forming a part of a prepacking machine or press indicated generally at 50 and described in detail hereinbelow.

Upon termination of operation of the conveyor drive 18 in the control operation by the sensing device 28 referred to above, no material drops from the conveyor into the bucket 20 and the amount of material in the bucket as determined by the weight thereof which caused the actuation, is thus accurately measured and dropped into the trough 48. After emptying of the bucket, or after a certain interval of time, or both, the bucket 20 rises to its original position and the sensing device 28 performs certain other functions, including causing reoperation of the conveyor drive resulting in delivery of the plastic material 12 again into the bucket 20; it also deenergizes the solenoid 30 whereupon the element 36 of the valve 32, in accordance with the law of operation of the valve, moves again to the position of FIG. 1 and the fluid in the cylinder 42 flows out through the line 40 and the exhaust line 52 of the valve. This permits the compression spring 54 in the cylinder 42 to bias the piston 44, and hence the arm 46, to their original retracted position of FIG. 1, and close the gate 22, this step taking place of course before the delivery of the plastic material again from the conveyor into the bucket.

The foregoing steps in the operation are repeated in cyclic manner to provide a succession of quantities of the material at the desired rate for the successive pre-packing operation in the pre-packing machine or press 50 in accordance with the description and explanation hereinbelow. It will be appreciated that regardless of the character of the plastic material being delivered through the apparatus of FIGS. 1 and 2 the quantities of the material are of uniform weight in accordance with the operation of the devices 20 and 28. Regardless of the character of the particles making up the material, i.e., whether they are fibers, flakes, etc., the final packed articles are of uniform density because of the resulting uniform volume and weight.

Attention is now directed to FIGS. 3 to 7 inclusive for a detailed description of the pre-packing machine 50. This pre-packing machine may be made of any suitable material such as wood or metal and includes a relatively elongated vertical portion 56 which supports certain other portions of the machine including the trough 48 referred to above. The portion 56 defines a chamber 58 therein and rests upon a base 60 which in the present instance also serves as a die liner. The trough 48 referred to above is defined by a bottom horizontal plate 62 suitably secured to the vertical portion 56, and side plates 64 and 66 secured to the bottom plate, the side plate 64 being secured also to the vertical portion 56.

A pusher plate 68 is disposed in the trough 48 for performing an initial pre-packing step. This pusher plate 68 is mounted on the outer end of a piston rod 70 of a piston 72 in a power cylinder 74. The power cylinder 74, which may be hydraulically operated, for example, is controlled by a reversing valve 76 in turn actuated by a solenoid 78 which acting through its armature 80 moves elements 82 from a first position shown in FIG. 3 to a relatively reversed position shown in FIG. 4. When the valve is in the position shown in FIG. 3 the fluid flows inwardly through an inlet line 84 and a line 86 into the cylinder and retracts the piston to the position shown. In this step, the fluid is exhausted from the cylinder through the line 88 and the exhaust line 90.

When the valve is reversed to the position of FIG. 4 the fluid flows into the cylinder through the line 88 and advances the piston to the position shown in that figure, and in this step the fluid is exhausted from the valve in a reverse direction as is shown. The piston 72 of course correspondingly advances and retracts the pusher plate 68.

In the assumed order of operation of the apparatus and as indicated above, the weighed material is delivered from the bucket 20 into the trough 48 and upon advancement of the pusher plate 68 that quantity of the plastic material here identified as 12a is forced by the pusher plate into a second compartment or trough 92 which is defined on the bottom by the plate 62 and a side wall 94. A second pusher plate 96 is provide for actuation in the compartment or trough 92. This pusher plate 96 is mounted on the outer end of a piston rod 98 of a piston 100 in a power cylinder 102 which is actuated in a manner similar to the power cylinder 74 as described above, under the control of a reversing valve 104 and an accompanying solenoid 106.

The plastic material 12a on being pushed or discharged from the trough 48 into the trough 92 is slightly pre-packed or compacted. Pressures involved in this step, as well as the subsequent steps, will be described hereinbelow. This slightly pre-packed material now identified as 12b in FIG. 4 is in position for an additional pre-packing step by the pusher plate 96, this step being accomplished upon actuation of the solenoid 106 and reversal of the valve 104 to the position shown in FIG. 5, whereupon the actuating fluid is delivered into the power cylinder 102 which advances the piston 100 and consequently the pusher plate 96 which in turn pushes the quantity of plastic material 12b into the chamber 58 of the vertical portion 56 of the machine. This quantity of plastic material now has been pre-packed in a second step and is identified as 12c. In this second pre-packing step the pusher plate 68 serves as one side wall of the trough 92, guiding the plastic material into the chamber 58.

Reference is now made to FIGS. 6 and 7 for a third step in the pre-packing operation. Operably disposed in the chamber 58 is a third pusher plate 108 mounted on a rod 110 of a piston 112 operable in a power cylinder 114. The power cylinder 114 is controlled by a reversing valve 116 in turn controlled by a solenoid 118, this power cylinder being similar to and operating similarly to the power cylinders 74 and 102. In the position of the valve 116 in FIG. 6 the piston and the pusher plate 108 are retracted and upon actuation of the valve to the position shown in FIG. 7 the piston and the pusher plate are advanced, i.e., moved downwardly. This latter step pushes the quantity of plastic material 12c downwardly, into a cavity 120 in the die liner 60. In this step the pusher plate 68 defines one portion of the side wall of the chamber 58 confining the plastic material in the packing operation at that location. The pusher plate 108 is advanced preferably to the position in which its undersurface is flush with the top of the cavity 120. The quantity of plastic material in this third pre-packing step is considerably compacted and now is identified as 12d.

The foregoing three steps constitute a practical pre-packing operation, in that the article produced, 12d, is devoid of the non-uniformity and resistance to flowing under high pressure, and it may be utilized in that condition in regular commercial operations, but it is usually desired that it be more highly compacted. The apparatus of the present invention is especially adapted for performing an additional and high-pressure compacting step. For this step, attention is directed to FIGS. 8 and 9 which show a movable die 122 in which the high-pressure compacting is performed. This die includes a block 124 having an opening therethrough in which a bushing 126 is disposed, the bushing defining a cavity 128 aligned with the cavity 120. A pair of horizontal punches or rams 130 and 132 are operably disposed in the cavities 120 and 128, being initially at the dotted line positions indicated at 130a and 132a respectively, for receiving therebetween the quantity of plastic material 12d. The die 122 is then moved to the solid line position shown in FIG. 8. Thereafter the punch 130 is moved horizontally to the position shown in FIG. 9. The punch 132 is held stationary and the other punch 130 is advanced from the position of FIG. 8 to the position of FIG. 9 in which operation the quantity of plastic material is additionally compressed to the volume shown in FIG. 9. This plastic material now identified as 12e is in the form of a cake or pellet and of the desired size and weight in accordance with other cakes or pellets measured according to volume and compacted as in the case of material of uniform density.

It will be understood that the various controls, such as valves and solenoids, may be operated automatically by known methods, or manually, as desired, being operated in either case sequentially in the order stated.

Each pre-packing step, following the first, is performed in directions transverse to the previous one. This arrangement results in a final end product that is of uniform density. In the case of plastic material of the character described above, namely of irregular and non-uniform particles, and having the additional disadvantages of stickiness or tackiness, apparatus and methods heretofore known result in extremely non-uniform compacting when high pressures are applied in only one direction throughout the compacting operation. Such attempt at pre-packing that kind of material in a single packing or compression movement would necessitate application of the pressure throughout a relatively great length, because of the lightness and looseness of the material. As the pressure builds up the resistance to compression increases and the compacting effect is not transmitted through the mass of material and as a result the material tends to cling to the walls defining the cavity in which the compacting is being performed. As a result, the compacting operation is extremely irregular, with the portion close to the ram being compacted greatly, and the portion remote therefrom being compacted only slightly or not at all.

In the present instance this difficulty is overcome by the relatively transverse directions of compacting in successive steps. For example, in the first pre-packing step indicated between FIGS. 3 and 4, the pressure is applied horizontally and to the left as observed by the viewer. In the second step the pressure is applied horizontally, but in a direction transverse to that of the first step. In the third step as indicated between FIGS. 6 and 7, the pressure is applied vertically, which is thus transverse to the direction of the application of pressure of the second step, and it is also transverse to that of the first step. In the final step as indicated between FIGS. 8 and 9, the direction of application of pressure is transverse to that of the third step, and in this instance it is in the direction of one of the earlier steps, namely, the first step (or opposite and parallel thereto).

The pressures utilized in the pre-packing steps are progressively increased. For example, the pressure utilized in the first step may be in the range of from nearly zero to a maximum of not substantially more than five p.s.i. This pressure, because it is relatively low, is substantially transmitted through the length of the mass of the material in the direction of the compression. This relatively low pressure does not result in great resistance by the plastic material such as would tend to cause it to cling or adhere to the side walls defining the cavity in which it is compressed.

In the second pre-packing step pressures similar to those utilized in the first step may be utilized, and in this case also the pressure is effectively transmitted substantially through the length of the mass in the direction of the compression. Any resistance to packing, or tendency to adhere to the side walls in the first step is not carried over to the second, because the direction of pressure in the second step, being transverse to that of the first step, is directed on all of the portions of the material along the direction of pressure of the first step and hence applied to all portions regardless of the compressed conditions produced by the first step.

The same considerations exist in connection with the third pre-packing step but in this step considerably greater pressures are involved, for example, of from between about five p.s.i. to in the neighborhood of one hundred p.s.i. It will be understood that these greater pressures may be applied because of the partial compression of the material, the pressure being applied across the previous conditions of pre-packing and regardless of the condition of compactness produced by the previous pre-packing steps.

Finally in the last step, i.e., that represented by the relative positions of the parts as between FIGS. 8 and 9, pressures may vary from several thousand p.s.i. to in the neighborhood of fifty thousand p.s.i. In this last step the previous condition of the material was such that the coherence between the particles or portions of the material is such as to prevent the particles from clinging or sticking to the side walls of the cavity under those intense pressures.

The final compacted article, 12e, is now in a condition of size and weight, and hence density, comparable to other materials that may be measured according to volume, and in successive cycles such final products are all entirely uniform.

While we have disclosed herein a certain preferred embodiment of the invention, it will be understood that changes may be made therein within the scope of the appended claims.

We claim:

1. Apparatus for pre-packing material that is loose and highly non-uniform as to density comprising, in combination, a vertical stand portion and a chamber construction supported thereby, said chamber construction including a horizontal deck, side wall members secured to said deck at each of opposite side edges thereof between which is a first chamber, a first pusher plate mounted in said first chamber and movable between said side wall members and also movable between a retracted position at one end of the chamber and an advanced position at the opposite end of the chamber, means for so moving said first pusher plate, a third side wall member secured to an edge of said deck opposite said first chamber and disposed perpendicular to the direction of movement of said first pusher plate and spaced from said advanced position of that pusher plate, said third side wall member and said first pusher plate, when the latter is in advanced position, forming a second chamber therebetween, a second pusher plate in said second chamber and movable between said third wall member and first pusher plate and also movable between a retracted position and an advanced position along a line parallel with said third side wall member and perpendicular to the direction of movement of said first pusher plate, said stand portion containing a vertical third chamber communicating with said second chamber, said second pusher plate, when in advanced position, forming a side wall element partially defining said vertical third chamber, a third pusher plate in said vertical third chamber movable vertically between an upper position and a lower position, means for so moving said third pusher plate, a first die member below said vertical third chamber having a cavity for receiving the material from said vertical third chamber, said third pusher plate in its lower position substantially coinciding with the upper limit of said cavity, means operative in said first die member, when said third pusher plate is in its lower position, for additionally and horizontally packing material received in said capity from said vertical third chamber, said means operative in said first die member comprising a pair of rams extending into said cavity in said first die member from opposite sides thereof and which are operable together for moving material from said cavity horizontally therefrom, a second die member disposed laterally from said die member and having a second cavity aligned with the first mentioned cavity in said die member, means comprising said pair of rams for effecting movement of the material which is between the rams into said second cavity, and means for thereafter holding one of said rams stationary and moving the other thereagainst for compressing the material therebetween in the second cavity.

2. Apparatus for pre-packing material that is loose and highly non-uniform in density comprising, in combination, a series of connected packing chambers in angular relationship to one another and having driven pusher plates successively movable therein in directions transverse to one another and along the respective packing chambers between retracted and advanced positions, means for actuating the pusher plates in a successive order to effect successive increases of packing pressure on the material in transverse directions in said packing chambers, a first die member having a cavity therein for receiving said material from the last of said series of connected packing chambers, a second die member having a cavity adjacent, aligned and communicating with the cavity in said first die member, means comprising a pair of rams movable in the cavities in said first and second die members and movable together for effecting movement of said material from the cavity in the first die member to the cavity in the second die member, and means for thereafter effecting further compression of the material between the rams of said pair and in the cavity of the second die member.

References Cited by the Examiner

UNITED STATES PATENTS

| | | | |
|---|---|---|---|
| 1,284,756 | 11/1918 | O'Donnell | 100—232 |
| 2,057,121 | 10/1936 | Trevellyan | 19—144.5 X |
| 2,127,300 | 8/1938 | Kobold | 264—120 |
| 2,295,287 | 9/1942 | Muench. | |
| 2,355,675 | 8/1944 | Pryor et al. | 100—232 X |
| 2,719,329 | 10/1955 | Gard | 264—120 |
| 2,736,923 | 3/1956 | Schieser et al. | 18—30 |
| 2,760,232 | 8/1956 | Rougemont et al. | 18—30 |
| 2,822,577 | 2/1958 | Schieser et al. | 18—30 |
| 2,960,927 | 11/1960 | Aichelen | 100—232 |
| 3,141,401 | 7/1964 | Lindemann et al. | 100—232 X |
| 3,192,561 | 7/1965 | Archer et al. | 18—5 |

WILLIAM J. STEPHENSON, *Primary Examiner.*

ROBERT F. WHITE, *Examiner.*

F. S. WHISENHUNT, *Assistant Examiner.*